Feb. 12, 1952  E. E. LIBMAN  2,585,665
CONTROL SYSTEM FOR TAXICAB METERS
Filed Jan. 17, 1951
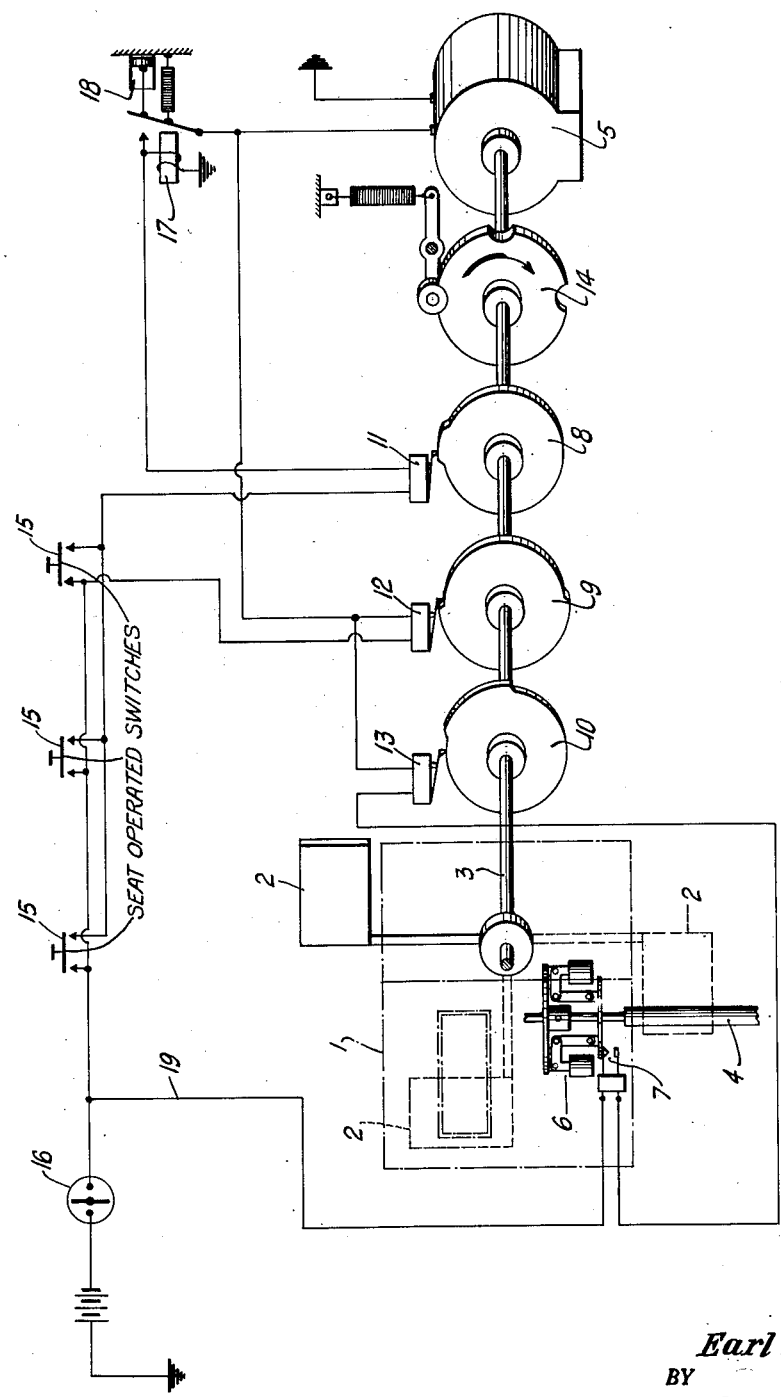
INVENTOR.
*Earl E. Libman*,
BY
*Edward L. Mueller*
ATTORNEY.

Patented Feb. 12, 1952

2,585,665

UNITED STATES PATENT OFFICE 2,585,665

CONTROL SYSTEM FOR TAXICAB METERS

Earl E. Libman, Brooklyn, N. Y., assignor to Control Instrument Company, Inc., Brooklyn, N. Y., a corporation of New York Application January 17, 1951, Serial No. 206,481

5 Claims. (Cl. 177—311)

This invention relates to improvements in meters of the type used for registering fares in taxicabs, and has particular reference to a control system for such meters.

In meters of the above type now commonly employed, the operation thereof and consequent registration of a fare is dependent upon the manual operation, by the driver of the vehicle, of adjusting the meter signal from a normal or non-occupancy position to the occupancy position thereof, thus creating a condition whereby the driver may intentionally fail to adjust the signal, charge an arbitrary fee for the trip and withhold said fee from his employer.

The present invention contemplates, generally, an improved system of meter control which will eliminate the possibility of such surreptitious action as above mentioned by removing certain of the controls of the meter from the province of the vehicle driver and making them dependent upon an action of a passenger at the beginning of a trip, and movement of the vehicle following the discharge of the passenger at the conclusion of said trip.

More specifically, the seating of a passenger in the vehicle is utilized to initiate the operation of a drive for the meter signal which will move the latter from its normal or non-occupancy position to the occupancy position thereof to thus render operative the registering mechanism of said meter. Then, at the conclusion of said trip, the signal is manually moved by the driver to a passenger-discharge position to stop said registering mechanism and, upon subsequent movement of the vehicle, the signal is automatically returned to normal or, if another passenger enters the vehicle, the signal is similarly moved through said normal position to the occupancy position thereof.

The inventive idea involved is capable of receiving a variety of expressions one of which, for purposes of illustration, is shown in the accompanying drawing; but it is to be expressly understood that said drawing is employed merely to facilitate the description of the invention as a whole and not to define the limits thereof, reference being had to the appended claims for this purpose.

In the drawing the figure is a diagrammatic view of a control system for a meter constructed and arranged in accordance with the present invention.

The control system herein disclosed is applicable to any conventional type of meter, indicated by the dot and dash lines 1, which carries a visual signal 2 in the form of a flag mounted on the shaft 3 and adapted to be turned to different positions to control the operation of the registering mechanism of the meter. Said mechanism is coupled to the transmission of the vehicle by the usual shafting 4 so as to be driven thereby when the vehicle is moving and after the signal 2 is manually turned 180° from its normal upright or non-occupancy position to the occupancy position thereof; and, at the termination of a trip said signal is again manually turned 90° to the passenger-discharge position to stop the registering mechanism whereupon, after payment of the fare indicated on the meter, said signal is manually returned to normal, or again to the occupancy position in the event that another passenger immediately enters the vehicle.

In accordance with the present invention, the conventional type of meter is modified by extending the shaft 3 and coupling the same to a small motor 5 for turning said shaft and the signal 2 carried thereby to adjust the latter from normal to its occupancy position and also from the passenger-discharge position back to normal, the adjustment of said signal from occupancy to passenger-discharge position being accomplished manually. The conventional meter is further modified by operatively connecting to the shaft 4 any known type of centrifugal switch, such as indicated at 6, which is operated, when said shafting is driven by the vehicle transmission, to close the contacts 7 whereby the signal 2 is automatically turned from its passenger-discharge position to normal, as will be more fully described hereinafter.

To control the operation of the motor 5, the shaft 3 has mounted thereon three cams 8, 9 and 10 which operate successively to close the associated microswitches 11, 12 and 13 to establish energizing circuits for said motor. A detent 14 also mounted on the shaft 3 stops the shaft and its signal 2 in proper indicating positions following successive de-energizations of the motor. The cams 8 and 9 and their respective switches combine to control the automatic movement of the signal from normal to its occupancy position, and the cam 10 and its switch 13 act to drive the signal from the passenger-discharge position back to normal.

Initiation of the operation of the signal from normal is passenger-controlled and is preferably accomplished by suitably disposing a number of switches 15 under the rear seat of the vehicle in such manner that when the passenger or passengers are seated, one or more of the switches will be closed to establish a circuit extending from battery through the ignition switch 16 of the vehicle, the switches 15 and 11, the latter of which is closed by its cam 8 in the normal position of the signal, and the winding of the slow-acting relay 17 to ground. Said relay 17 is made slow-acting by a dashpot 18, or any other suitable means, so that the circuit therefor will not be momentarily closed by any movement of the rear seat of the vehicle when the same is empty, as when the vehicle is moving over a rough surface. Upon closure of the armature contact of the relay 17, the previously described circuit is extended through said contact to the motor 5 and thence to ground, thereby energizing said motor and turning the shaft 3 along with the cams and detent thereon. The cam 8 is cut so as to maintain the switch 11 closed only for a slight degree of rotation of the shaft, and before said switch 11 is opened by its cam, the cam 9 closes the switch 12. Opening of the switch 11 breaks the energizing circuit for the relay 17 which then de-energizes, and closure of the switch 12 establishes another circuit which shunts said relay and extends from one of the switches 15 through the switch 12 and thence through the motor 5 to ground, thus maintaining said motor energized. Cam 9 maintains this circuit until just before the signal 2 reaches the occupancy position, whereupon said cam permits the switch 12 to open and the detent 14 then becomes effective to stop rotation of the shaft 3 and its signal in the occupancy position.

At the termination of a trip, the driver of the vehicle moves the signal to the passenger-discharge position to stop operation of the registering mechanism of the meter, and said signal remains in this position until the vehicle again starts to move. When the signal 2 is manually moved to the last named position, the shaft 3 is turned so that the cam 10 will close the microswitch 13 to prepare another circuit for the motor 5.

If no other passenger has entered the vehicle, the movement thereof operates the centrifugal switch 6 through the shafting 4 to close the contacts 7 whereby a circuit is established for the motor 5 extending from battery over the conductor 19, the now closed contacts 7, the closed switch 13 and thence to ground through the motor 5 which then operates to drive the shaft and thus return the signal to normal position. Just before reaching this position, the cam 10 permits opening of the switch 13 to disable the motor and the detent 14 then becomes effective to stop further rotation of the shaft with all parts restored to normal and the microswitch 11 closed by cam 8.

Should another passenger immediately enter the vehicle with the signal 2 still in its passenger-discharge position, the subsequent starting of the vehicle will immediately close the contacts 7 to establish the previously described circuit for the motor 5 through the switch 13 and the signal will then be driven to its normal position in which the switch 11 is again closed by its cam 8. With a passenger now seated in the vehicle the circuit for the relay 17 is re-established through the switch 11 and, as a consequence, the signal 2 will be driven through its normal position and the same sequence of operation above described will take place.

What is claimed is:

1. In a control system for taxicab meters, the combination with a meter and a signal therefor having non-occupancy, occupancy and passenger-discharge indicating positions; of a drive for said signal, circuit means including a pressure actuated passenger controlled switch for operating said drive to alter the position of said signal to occupancy position, a second switch for operating said drive adapted to be actuated by the movement of the vehicle to again alter the position of said signal to non-occupancy position subsequent to the discharge of a passenger.

2. In a control system for taxicab meters, the combination with a meter, and a signal therefor having different indicating positions; of a shaft carrying said signal, a motor for driving said shaft, a circuit for said motor including a passenger-controlled switch, a second switch, and a relay in series with said switches, a cam on said shaft closing said second switch when said signal is in one position to energize said circuit upon closure of said passenger-controlled switch to thereby drive said shaft and move said signal toward another position, another circuit for said motor shunting said passenger-controlled switch, said second switch and said relay, a second cam on said shaft, a third switch in said shunt circuit closed by said second cam to continue operation of said motor after said signal has been moved from the first named position and also opened by said cam to open said shunt circuit, and means to stop said shaft and signal in said other position following the opening of said shunt circuit by said second cam.

3. In a control system for taxicab meters, the combination with a meter, operating means therefor, and a signal for said meter having different indicating positions; of a shaft carrying said signal, a motor for driving said shaft, a circuit for said motor including a passenger-controlled switch, a second switch, and a relay in series with said switches, a cam on said shaft closing said second switch when said signal is in one position to energize said circuit upon closure of said passenger-controlled switch to thereby drive said shaft and move said signal toward another position, another circuit for said motor shunting said passenger-controlled switch, said second switch and said relay, a second cam on said shaft, a third switch in said shunt circuit closed by said second cam to continue operation of said motor after said signal has been moved from the first named position and also opened by said cam to open said shunt circuit, means to stop said shaft and signal in said other position following the opening of said shunt circuit by said second cam, a third cam on said shaft, a fourth switch controlled by said third cam and also included in said shunt circuit, and means controlled by said meter operating means, when said fourth switch is closed, to operate said motor through said shunt circuit to thereby move said signal to its first named position.

4. In a control system for taxicab meters, the combination with a meter, operating means therefor, and a signal for said meter having non-occupancy and passenger-discharge indicating positions, said signal being manually movable from the second to the third mentioned position; of a shaft carrying said signal, a motor for driving said shaft, means including passenger-controlled means for energizing said motor to move said signal from the first to the second named position, a switch connected to said meter operating means for closure thereby when a vehicle is moving, and means controlled by said switch after manual operation of said signal to again energize said motor to move said signal from its third named position to the first named position thereof.

5. In a control system for taxicab meters, the combination with a meter, operating means therefor, and a signal for said meter having non-occupancy, occupancy and passenger-discharge indicating positions, said signal being manually movable from the second to the third named position; of a shaft carrying said signal, a motor for driving said shaft, a circuit for energizing said motor, a passenger-controlled switch in said circuit, a plurality of cams on said shaft, other switches in said circuit operated by said cams for energizing said motor to drive said signal from the first named position under the dual control of one of said cam operated switches and said passenger-controlled switch and to the second named position under exclusive control of another of said cams and the switch operated thereby, and means controlled by said meter operating means and another of said cam operated switches, following the manual movement of said signal to the third named position, for moving said signal from the latter position to its first named position.

EARL E. LIBMAN.

REFERENCES CITED

The following references are of record in the file of this patent:

UNITED STATES PATENTS

| Number | Name | Date |
|---|---|---|
| 1,566,038 | Orth et al. | Dec. 15, 1925 |
| 1,850,740 | Brownell | Mar. 22, 1932 |
| 1,850,741 | Brownell | Mar. 22, 1932 |
| 1,878,596 | Papefthemeon | Sept. 20, 1932 |